US00RE45406E

(19) United States
(12) Reissued Patent
Dewolde

(10) Patent Number: US RE45,406 E
(45) Date of Reissued Patent: Mar. 3, 2015

(54) PROGRAM ENCODING AND COUNTERFEIT TRACKING SYSTEM AND METHOD

(71) Applicant: Deluxe Laboratories, Inc., Los Angeles, CA (US)

(72) Inventor: Jeffrey H. Dewolde, Newmarket (CA)

(73) Assignee: Deluxe Laboratories, Inc., Los Angeles, CA (US)

(21) Appl. No.: 13/655,229

(22) Filed: Oct. 18, 2012

Related U.S. Patent Documents

Reissue of:
(64) Patent No.: 7,818,257
Issued: Oct. 19, 2010
Appl. No.: 10/893,508
Filed: Jul. 16, 2004

(51) Int. Cl.
*G06F 21/00* (2013.01)
*G06F 21/10* (2013.01)

(52) U.S. Cl.
CPC ..... *G06F 21/10* (2013.01)
USPC ..... 705/57; 382/181; 382/189; 382/198; 382/194; 382/200

(58) Field of Classification Search
USPC ..... 705/57
See application file for complete search history.

(56) References Cited

U.S. PATENT DOCUMENTS 5,080,479 A * 1/1992 Rosenberg ..... 352/92
5,251,041 A * 10/1993 Young et al. ..... 386/44
5,303,294 A * 4/1994 Kimoto et al. ..... 380/201
5,315,448 A * 5/1994 Ryan ..... 360/60
5,636,292 A * 6/1997 Rhoads ..... 382/232
5,680,454 A * 10/1997 Mead ..... 380/204
5,699,427 A * 12/1997 Chow et al. ..... 705/58
5,710,834 A * 1/1998 Rhoads ..... 382/232
5,743,615 A * 4/1998 McIntyre et al. ..... 353/122
5,751,368 A * 5/1998 Cooper ..... 348/512
5,809,160 A * 9/1998 Powell et al. ..... 382/100
5,850,481 A * 12/1998 Rhoads ..... 382/232
5,859,920 A * 1/1999 Daly et al. ..... 382/115

(Continued)

FOREIGN PATENT DOCUMENTS

EP 899688 1/2001
EP 0899688 A3 1/2001

(Continued)

OTHER PUBLICATIONS

Neil F. Johnson, Information Hiding, Kluwer Academic Publishers pp. 28-29.*

*Primary Examiner* — Zeshan Qayyum
(74) *Attorney, Agent, or Firm* — Greenberg Traurig LLP

(57) ABSTRACT

Unique encoding of each of a substantial number of distribution video copies of a program such as a motion picture is produced by altering the images slightly at several pre-selected locations in the program in a uniquely coded pattern. Suspected counterfeits can be compared with an unaltered master video to determine the encoded number for the copy which was counterfeited to enable tracking the source of the counterfeit. Preferably, each frame of several whole scenes is altered at each location by shifting an image so as to make the alterations largely undetectable by counterfeiters but easily detected by comparison with an unaltered master video. Artifacts are inserted in patterns representing a unique number for the program. These supplement the encoding by alteration of images and gives added means to aid in tracing counterfeit copies.

18 Claims, 2 Drawing Sheets

(56) References Cited

U.S. PATENT DOCUMENTS

| | | | | |
|---|---|---|---|---|
| 5,959,717 | A * | 9/1999 | Chaum | 352/40 |
| 6,005,643 | A * | 12/1999 | Morimoto et al. | 375/240.26 |
| 6,018,374 | A * | 1/2000 | Wrobleski | 348/744 |
| 6,044,156 | A * | 3/2000 | Honsinger et al. | 380/54 |
| 6,072,888 | A * | 6/2000 | Powell et al. | 382/100 |
| 6,122,392 | A * | 9/2000 | Rhoads | 382/100 |
| 6,285,774 | B1 * | 9/2001 | Schumann et al. | 382/100 |
| 6,325,420 | B1 * | 12/2001 | Zhang et al. | 283/70 |
| 6,354,630 | B1 * | 3/2002 | Zhang et al. | 283/70 |
| 6,396,594 | B1 * | 5/2002 | French et al. | 358/1.18 |
| 6,459,803 | B1 * | 10/2002 | Powell et al. | 382/100 |
| 6,529,600 | B1 * | 3/2003 | Epstein et al. | 380/252 |
| 6,542,618 | B1 * | 4/2003 | Rhoads | 382/100 |
| 6,556,273 | B1 | 4/2003 | Wheeler | |
| 6,558,273 | B2 * | 5/2003 | Kobayashi et al. | 473/349 |
| 6,624,874 | B2 * | 9/2003 | Revelli et al. | 352/90 |
| 6,628,801 | B2 * | 9/2003 | Powell et al. | 382/100 |
| 6,678,392 | B2 * | 1/2004 | Powell et al. | 382/100 |
| 6,681,029 | B1 * | 1/2004 | Rhoads | 382/100 |
| 6,735,776 | B1 * | 5/2004 | Legate | 725/25 |
| 6,757,406 | B2 * | 6/2004 | Rhoads | 382/100 |
| 6,760,463 | B2 * | 7/2004 | Rhoads | 382/100 |
| 6,778,682 | B2 * | 8/2004 | Rhoads | 382/100 |
| 6,845,170 | B2 * | 1/2005 | Wendt | 382/100 |
| 6,920,232 | B2 | 7/2005 | Rhoads | |
| 7,003,132 | B2 * | 2/2006 | Rhoads | 382/100 |
| 7,007,167 | B2 * | 2/2006 | Kurahashi | 713/176 |
| 7,062,070 | B2 * | 6/2006 | Powell et al. | 382/100 |
| 7,068,811 | B2 * | 6/2006 | Powell et al. | 382/100 |
| 7,116,781 | B2 * | 10/2006 | Rhoads | 380/59 |
| 7,184,570 | B2 * | 2/2007 | Rhoads | 382/100 |
| 7,206,409 | B2 * | 4/2007 | Antonellis et al. | 380/202 |
| 7,295,677 | B2 * | 11/2007 | Simpson et al. | 382/100 |
| 2002/0168069 | A1 * | 11/2002 | Tehranchi et al. | 380/235 |
| 2003/0091189 | A1 * | 5/2003 | Rhoads | 380/252 |
| 2003/0174769 | A1 * | 9/2003 | Nagumo et al. | 375/240.02 |
| 2003/0187674 | A1 * | 10/2003 | Odgers et al. | 705/1 |
| 2003/0187679 | A1 * | 10/2003 | Odgers et al. | 705/1 |
| 2003/0202679 | A1 | 10/2003 | Rodriguez | |
| 2004/0033051 | A1 * | 2/2004 | Ip | 386/35 |
| 2004/0033060 | A1 * | 2/2004 | Beaton | 386/117 |
| 2004/0103293 | A1 * | 5/2004 | Ryan | 713/193 |
| 2004/0109016 | A1 | 6/2004 | Antonellis et al. | |
| 2005/0273698 | A1 * | 12/2005 | Smith et al. | 715/511 |
| 2006/0026431 | A1 * | 2/2006 | Campello De Souza | 713/176 |

FOREIGN PATENT DOCUMENTS

| | | | |
|---|---|---|---|
| EP | 1217840 | | 7/2004 |
| EP | 1217840 | A3 | 7/2004 |
| GB | 1235765 | | 12/1998 |
| GB | 2325765 | A | 12/1998 |
| WO | 2004/030339 | | 4/2004 |
| WO | WO 2004/030339 | A3 | 4/2004 |

* cited by examiner

PROGRAM ENCODING AND COUNTERFEIT TRACKING SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*The present application is a reissue of U.S. Pat. No. 7,818,257, granted from U.S. patent application Ser. No. 10/893,508, filed Jul. 16, 2004.*

This invention relates to the encoding of audio-visual programs such as motion pictures and the tracking of counterfeit program copies, particularly counterfeit copies made from releases of a motion picture in video form.

"Motion picture", as that term is used herein, includes any type of program material using moving images as a medium of expression. It can include episodes of broadcast television programs, corporate events, as well as "movies", etc.

When a new movie is released, it usually is released in both film and video versions. The first copies, both film and video copies, usually are "screeners" sent to studio executives, advertising agencies, Motion Picture Academy Members and others. Later, film copies are sent to theaters and video copies are sent to airlines and hotels, then to pay-per-view distributors, and, finally, to free television broadcasters.

The production and sale of counterfeit copies of motion pictures is a serious problem of long standing. Counterfeit copies of new motion pictures sometimes are sold to the public even before the motion picture has been released by the motion picture studio. These counterfeit copies are hard to trace, and it is a difficult job to identify and bring the counterfeiters to justice.

A particularly crude but effective type of counterfeiting of film version of movies is the use of a video camera to copy a motion picture from a movie screen. The copy made by this technique then is converted to video tape or DVD records, and the records are sold to the public and otherwise distributed, such as by way of the internet.

Video program counterfeiting usually is done by obtaining a legitimate copy of the program and copying it with the use of video capture cards or use of means known for the purpose.

Attempts have been made in the past to stem the tide of such counterfeits. An effective system and method for tracing the sources of counterfeits of motion pictures is described in U.S. patent application Ser. No. 10/657,287 filed on Sep. 9, 2003, which is assigned to Deluxe Laboratories, Inc., the assignee of this patent application. The disclosure of that patent application is hereby incorporated herein by reference.

The method described in that patent application uses coded arrays of artifacts to uniquely identify each copy distributed. Detection of the coded identification numbers from the counterfeit copies aids in tracking the source of the counterfeits. As successful as that method is, it is desired to improve on it, especially when detecting the sources of counterfeits of video distribution copies of a new motion picture.

In certain prior proposals for video copy protection, noise has been embedded in the video signals in particular patterns to use in identifying the source. This has certain disadvantages, such as by requiring a substantial amount of extra hardware for use in recording the protected video copies.

Other so-called "electronic water-marking" schemes have been proposed and are not believed to have been successfully employed in solving the problems intended to be solved by the present invention.

In accordance with the present invention, the images appearing in specific pre-selected places in the video program are slightly altered so as to be essentially unnoticeable to the viewer. The presence or absence of an altered picture at each of a number of pre-selected locations forms a code which represents a unique number applied to that copy of the motion picture. The unique number then is recorded and stored, together with an identification of the person or entity who receives the copy when it is distributed, so as to enable law enforcement personnel to review suspected counterfeit copies of the motion picture to read the code number and identify the recipient of the copy and thereby track down the source of the counterfeit copies.

Preferably, the alteration of the images consists of slightly shifting an image such as by changing the aspect ratio of the image. It is preferred to do this by enlarging an image slightly so that one or more edges of the image is moved relative to the same edge in the video master. Sometimes an image boundary overlaps a boundary of the frame and becomes invisible.

This alteration procedure helps enforcement personnel to compare the frame of a suspected counterfeit copy with an unaltered frame from an unaltered master copy of the motion picture to determine which of the images has been altered. When the pattern of alterations is detected, this will indicate the number of the copy which has been counterfeited and will lead to the possible source of the counterfeit.

In a preferred embodiment, the alteration of images is applied to each frame of a complete scene. This makes the alteration very difficult to detect without access to the unaltered master video.

It also is preferable that each of the pre-determined locations for alterations consisted of a plurality of successive or separated scenes in order to ensure detectability of the alterations by enforcement personnel.

In accordance with another aspect of the invention, the code recorded by image alteration is combined with the separate code provided by the invention of the above-identified co-pending U.S. patent application so that enforcement personnel have two different codes to look for in identifying the source of a counterfeit and confirming the number of the copy which has been counterfeited.

In making video copies containing the codes described above, a particularly advantageous method is used.

First, a video copy with images altered at pre-determined locations is prepared. Then, the master video which has not been altered is played back in one playback device, such as a video server, while the altered version is played back on another playback device such as a second video server. The output of both servers is delivered to a video router which controls a large number of different video recorders to simultaneously prepare copies in relatively large quantities.

A random number generator is employed to generate an identification number for each copy, and the number so generated is used to control one output channel of the router so as to alternatingly deliver the master video signal and the altered video signal and thereby record the altered images in a particular pattern which gives that copy a unique identification number.

The code made of artifacts is added by modifying the output signals of the second video server, in copies using both forms of coding.

The foregoing and other objects and advantages of the invention will be apparent from or explained in the following description and drawings.

IN THE DRAWINGS

GENERAL DESCRIPTION

Figure 1:
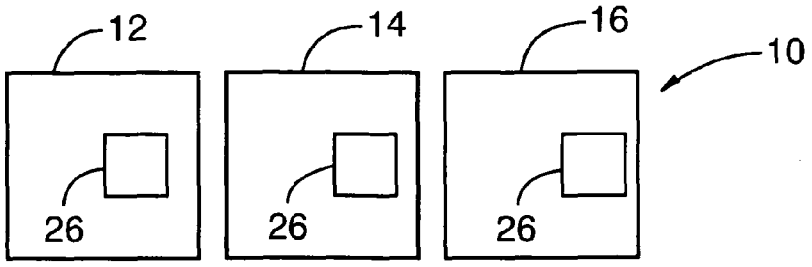
FIG. 1 is a schematic view of several unaltered frames of video programs.

FIG. 1 shows a series 10 of three successive frames 12, 14 and 16 from a single scene of a video program such as a motion picture.

Each frame contains an image of a square or block 26. It is moving from left to right and thus is shown progressively closer to the right edge of the frame as one moves from frame 12 to frame 16.

Figure 2:
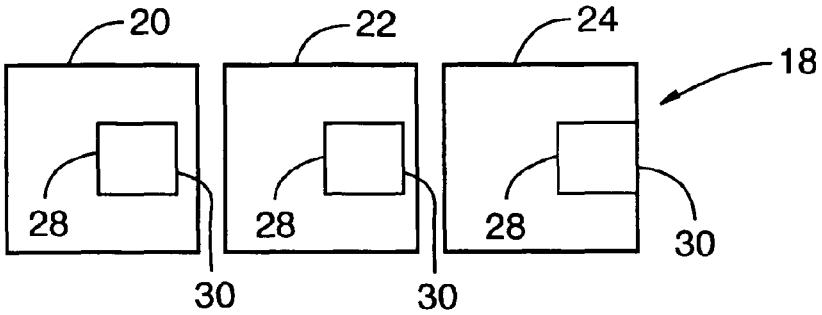
FIG. 2 is a schematic view of the same frames as those shown in FIG. 1, after alteration.

FIG. 2 shows the same three frames of the video program shown in FIG. 1 after alteration, in accordance with the present invention. The alteration, in this example, is an enlargement of the image by a relatively small amount, e.g., from less than 4% to 10%. The enlargement of the object 26 to form the image 20 shown in the drawings is greater than that so as to more clearly illustrate the principle of the process.

In each of the altered frames 20, 22 and 24 the right edge 20 of the enlarged object 28 is closer to the right-hand border of the frame than the unaltered object 26 in the corresponding frame of FIG. 1. In fact, in the right-most frame 24, the right edge 30 extends beyond the right edge of the frame and thus is not visible.

In accordance with a highly advantageous feature of the preferred embodiment of the invention, the same alteration of the images is applied to all frames of each scene in which alteration is applied.

The fact that a frame of the video program has been altered can be determined by viewing the altered frame in comparison with the same frame in the unaltered master video copy, such as by juxtaposing the two frames near one another, in the manner illustrated by FIGS. 1 and 2. However, it is believed to be very difficult for a counterfeiter to detect the alterations without having the unaltered master to compare the copy with.

This superior result is due, in part, to the fact that the same alteration is applied to every frame within the scene in which it is applied. Were this not done, a counterfeiter might be able to detect the alteration as a sudden change within a scene and take steps to correct his counterfeit copy to eliminate it. Instead, the sudden change from one scene to the next masks the sudden change caused by the alteration.

Since it is relatively easy to keep the unaltered master out of the hands of counterfeiters, the encoding of the invention is very difficult for counterfeiters to detect and defeat.

Coding Scheme

A variety of coding schemes can be used to encode a unique identification in each video distribution copy of a program.

In the preferred coding scheme, 64 different locations in the program are pre-selected. The locations can be selected at random. The time code of each location is stored. Thus, during review of a suspected counterfeit, the master can be run to each code location and still-framed when the code location is reached. When the corresponding portion of the copy is found and still-framed, frames in the master can be compared with corresponding frames of the copy.

A random number generator is used to generate a unique combination of signals forming a digital one or zero at each of the 64 locations. If the images are unaltered at a location, that is taken to be a digital zero. If the images are altered, that is taken to be a digital one.

The number of genuine copies made of many programs, such as movies, usually is relatively low, e.g., in the hundreds or low thousands. A 64-unit code is not necessary in order to uniquely identify each such copy. However, by providing so many digits, distinct advantages are obtained.

First, there is no need to access the code at its start because virtually any sequence of 10 to 15 digits can be compared with the codes stored for the copies until a unique match is found. A match can be found quickly and easily using conventional computer software.

Secondly, a longer code sequence is harder to completely delete when making an illegal copy. Thus, it is more likely that enough code will survive the counterfeiter's effort to destroy it.

The alterations preferably are repeated in each of a plurality of scenes at each of the 64 locations in order to avoid the loss of code due to cuts or deletions made in the copy by the counterfeiter, either deliberately or accidentally. Also, it facilitates detection of alterations by enforcement personnel because the alterations may be more visible in some scenes than others.

In addition, if a scene is repeated at a location very near its first appearance, both of the appearances will be altered and comparison of the two will yield nothing for the counterfeiter.

Encoding and Duplication System

Figure 3:
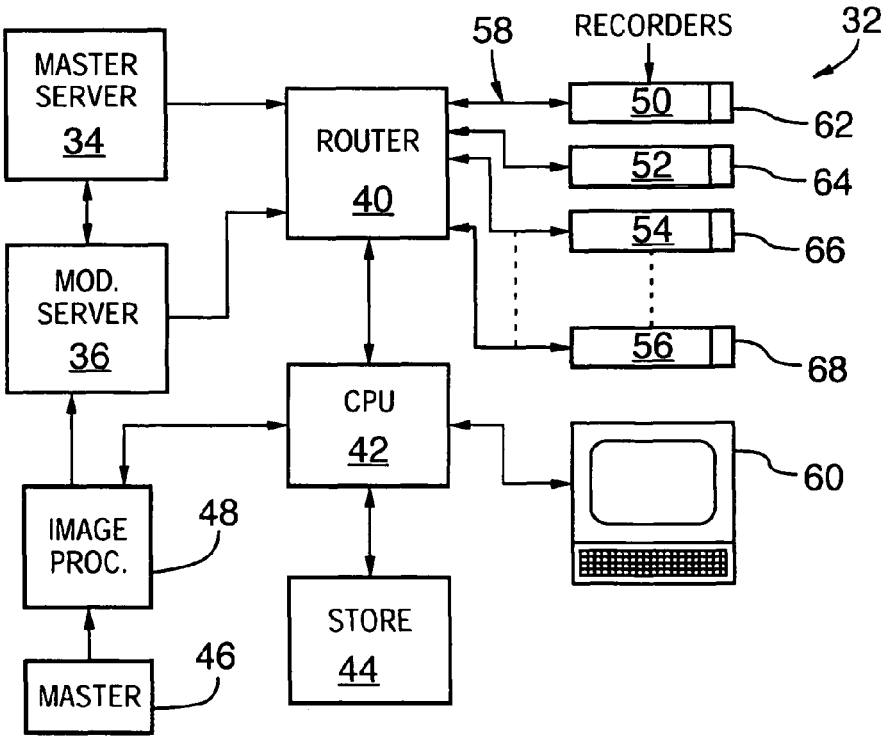
FIG. 3 is a schematic view of a system used to perform the encoding and prepare uniquely encoded video distribution copies of a motion picture or other program.

FIG. 3 is a schematic diagram of an encoding and video program duplication system 32.

The system includes a first video server 34, a second video server 36, a video router 40, a computer 42 with an input keyboard and screen 60, with a storage unit 44, and a plurality of video recorders 50, 52, 54, 56, etc., for making distribution video copies.

Although it does not take part in the production of copies, also shown in FIG. 3 are an image processor 48 which is used to alter the images output from the server 36 in accordance with instructions received from the computer 42.

The unaltered master video is stored in the first or "master" server 34, and the altered video is stored in the second or "modification" server 36. The altered video preferably has altered scenes at each of the 64 locations selected randomly by the computer 42.

Signals from the unaltered master video are sent from the master server 34 to the router 40 while altered video signals are sent from the modification server 36 to the router 40 in synchronism with the master video signals.

The video router 40, as it is well known, has the ability to switch rapidly back and forth between two input video signals to produce on each of a large number of output terminals 58 a unique video signal which is made up of signals from each source alternating with signals from the other source.

The computer 42 contains a random number generator which is used to generate a unique 64-digit random number which is assigned to and stored for each of the output terminals of the router.

Each of the recorders 50, 52, etc., has a unique bar code identifying it. Each blank DVD or tape on which the program is recorded also has a bar-code identifying it. These bar codes are read by the use of bar code readers 62, 64, 66 and 68, and associated with one another and stored in memory (e.g., a disk file) 44.

The random number code also is stored and associated with the bar codes for the recorder and the record. Similarly, the identification for the recipient of each copy is stored and associated with the copy identification.

The time codes for the 64 locations are stored once for each program and made available to enforcement personnel in order to check a suspected counterfeit.

It should be understood that the alterations to the images can take forms other than enlargements. For example, the images can be enlarged in one dimension only instead of in both height and width, images can be slightly reduced in size in both or only one dimension, etc.

Second Coding Method

Although the foregoing method can be used alone, it is preferred to use a second coding method in addition.

Figure 4:
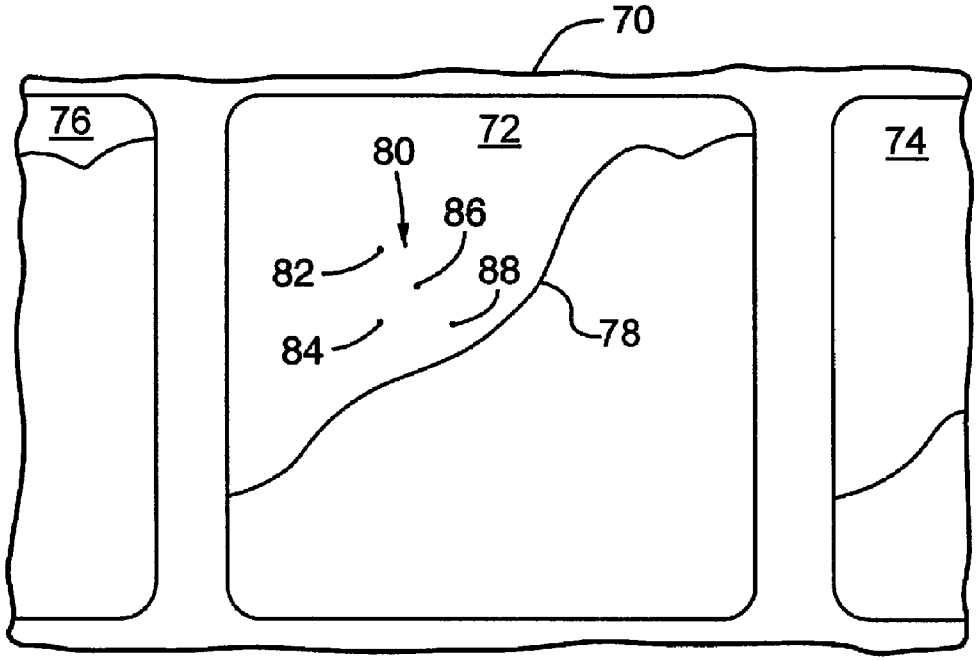
FIG. 4 is a schematic view of another encoding method used in tandem with the method illustrated in FIGS. 1 and 2.

FIG. 4 shows a segment 70 of a motion picture video master in which one frame bears an image, represented by the line 78, and a coded pattern 80 represents an alphanumeric character. One full frame 72 and parts of two adjacent frames 74 and 76 are shown in FIG. 4.

Preferably, the pattern is made of a plurality of very small dots 82, 84, 86 and 88 in a 3×3 dot matrix, although patterns and code elements other than those described can be used instead, as it will be explained in detail below.

Although any desired information can be encoded, in this invention, it is preferred that the pattern represent one of the digits of an identification number which is assigned to each video copy. Preferably, this is a 5 digit number starting with 00001 and increasing by one for each additional copy made. Thus, if 128 recorders are connected to the router 40 during a production run, the numbers used will be 00001 to 00128. In the second production run, the numbers assigned will be 00129 to 00257, etc.

For example, the dot pattern shown may represent the first digit "0" of the number "01736" which has been given to the copy. Similarly, a different dot pattern is used to represent the "1", the "7", and each other digit in the number.

During a record production run, the modification server 36 begins by generating the pattern for the number "0" in the first "placeholder" location. This pattern will appear for two film frames, immediately following an edit.

Locating a pattern immediately following an edit makes the dots harder to see. The patterns can be generated at any edit point throughout the program with the exception of edits within modified scenes; that is, within scenes in which the images have been altered as described above.

There are ten specific locations for each of the numbers 0-9 at the first placeholder location, ten more specific locations at the second placeholder location for the second number, ten more at the third placeholder location, and ten more at each of the fourth and fifth place holder locations.

Each of the specific locations is selected by the computer, and its time code is stored. Thus, if a pattern is found at a particular time code position in a suspected counterfeit program, it will not be necessary to be able to read the pattern; it will be known what the number is simply by its location. Of course, its place in the identification number (that is, whether it is the first, second, third, fourth or fifth digit) also is known, from the stored time codes.

In the production of a batch of copies (e.g., 128 copies), the modification server 36 first generates the pattern for the number "0" in the first placeholder position. All recorders that have been assigned the number "0" in the first placeholder position will now be switched by the router to receive an input feed from the modification server 36.

Next, the modification server 36 will generate the number "1" for the first placeholder. Once again, any recorders requiring the number "1" in the first placeholder will now be switched to the output of the server 36.

In this fashion, the system steps through all of the numbers in all of the placeholders; 0 to 9 in placeholder number 1; 0 to 9 in placeholder number 2, etc., until the patterns forming all the numbers to represent a different five-digit number for each copy have been recorded.

The numbers generated for each placeholder will not exceed what is required before moving on to the next placeholder. In the example "01736", there is no need to generate anything higher than a "1" in the second placeholder.

This process is repeated anywhere from 5 to 10 times throughout the duration of the program, depending on the run time of the program. Thus, the coded copy number is repeated 5 to 10 times during the program. This protects against destruction of the code patterns which frequently occurs due to data compression or deliberate destruction by the counterfeiter.

Preferably, the artifacts forming each code are formed by altering specific pixels of the video picture signals being transmitted from the second server 36 (FIG. 3). This can be done by simply reducing the luminance level to zero in a few pixels to form small dark dots, by controlling the video color level of the pixels on the video card's output board in the server 36. Preferably, this is done by programming the server 36.

Pixel luminance and chroma values may be brought to zero or any other level greater than zero. For example, it can be desirable to subtract a predetermined luminance value from the existing luminance value of the pixel. The amount to be subtracted is the minimum amount required to enable enforcement personnel to see the dots in a pirated copy. In this method, no more pixel level change is used than is necessary, and this makes the pixels less obvious. Similarly, colors can be used to create the necessary marks. For example, a combination of luminance and color can be used to create the color brown, which is less obvious than black.

In other words, the contrast between the artifact and the program material is made just high enough to make the artifacts visible to enforcement personnel who know where to look.

The dots 82, 84, 86, 88 are visible to the naked eye. Therefore, the print copy number can be read without any special equipment. However, reading is greatly aided by use of a stored record of where the codes are recorded in the film. With the aid of a time code reader and a video display unit, enforcement personnel can fast-forward to the locations in the program wherein the coded frames are located, and still-frame the codes frames for reading.

In this way, the other digits of the program code number can be read, and the records kept showing the entity or person to which each copy was sent will then help to quickly narrow the search for the counterfeiter.

The dots need not be circular. However, it is preferred that they look like specks of dirt. This prevents them from being too evident to ordinary movie patrons, and makes them harder to find by people who do not know where to look.

As it is explained in greater detail in the above-identified co-pending patent application, small marks other than dots can be used as code elements. Small marks which look like small scratches, elongated spots or color artifacts can be used When both encoding methods are used, enforcement personnel can use one method to check the accuracy of the other, or can select which one is easiest to read in a given counterfeit copy.

The above description of the invention is intended to be illustrative and not limiting. Various changes or modifications in the embodiments described may occur to those skilled in the art. These can be made without departing from the spirit or scope of the invention.

What is claimed is:

1. A method for uniquely identifying a copy of an audio-visual program [recorded in an electronic recording medium or optically recorded form, said], *the* method comprising:

selecting a master version of [an] *the* audio-visual program to be copied;

making at least one copy of the master version of [an] *the* audio-visual program such that each *respective* copy includes its own unique identification; [and] *wherein the master version of the audio-visual program comprises a sequence of frames of images, and wherein the making of the respective copy of the master version of the audio-visual program further comprises embedding the unique identification into respective copy of the audio-visual program by performing the following steps:*

[embedding the unique identification into each copy of the audio-visual program when making each copy of the audio-visual program by performing the following steps:

(a) altering visible images appearing at selected ones of a plurality of different locations in said master version of an audio-visual program by enlarging an image in at least one frame in each of said selected locations; and (b) selecting said ones of said locations in each copy to create a unique pattern of enlarged images in each copy to uniquely identify each copy]

*generating by a computing device an identifier using a random number generator;*

*selecting by the computing device a plurality of different locations in the sequences of frames according to the identifier;*

*enlarging by the computing device at least one frame in each of the plurality of locations in the sequence of frames in the copy according to the identifier;*

*creating by the computing device a unique pattern of enlarged frames in the sequence of frames in the copy; and*

*storing by the computing device an identity of a recipient of the copy and the unique pattern.*

2. A method as in claim 1 [including the step of], *wherein the storing comprises* storing, at a location separate from [said] *the* copy, information representing [said] *the unique* pattern for [each] *the* copy.

3. A method as in claim 1, in which all of [the] images in a scene are [altered] *enlarged* at each of [said] *the plurality of* locations *in the sequences of frames*.

4. A method as in claim 1, in which [said enlarging step comprises enlarging said image] *the at least one frame in each of the plurality of locations in the sequence of frames is enlarged* in at least one dimension by from approximately four to ten percent.

5. A method as in claim 1 [including], *further comprising* distributing a plurality of [said] copies, *including the copy having the unique pattern,* to a plurality of recipients [with each of said copies having a unique pattern, recording the identity of each of said recipients, and storing the patterns of each copy distributed to each of said recipients].

6. A method as in claim 1 [including the step of], *further comprising* introducing artifacts forming an encoded symbol in each copy *of the master version of the audio-visual program* at further selected [ones of a plurality of other] locations.

7. A method as in claim 6 including storing the locations of said artifacts for each copy [and storing the identification of the recipients of each copy].

8. A method as in claim 6 in which said artifacts are introduced at locations immediately following an edit.

9. A method as in claim 6 in which a plurality of specific locations is provided at each of a plurality of larger locations, there being one specific location in a larger location for each of ten numbers which forms one digit of an identification number for the copy being made, whereby the place and the digit can be determined by the specific location of the artifacts.

10. A method as in claim 1 in which the presence of an altered image in a selected frame indicates one of a digital 1 and a digital 0, and the absence of an altered image in said frame indicates the other of said digital 1 and 0, and the combination of digital 1's and 0's in a given sequence of selected frames forms a number unique to the program copy in which it appears.

11. A method as in claim 1, *wherein the plurality of different locations in the sequences of frames are selected to be* in [which said alteration is repeated in] a plurality of different scenes [at each of said locations] *in the audio-visual program*.

12. The method of claim 1, wherein the [image] *at least one frame in each of the plurality of locations in the sequence of frames* is enlarged by altering an aspect ratio of the image.

13. The method of claim 1, further comprising making a plurality of copies of the master version of [an] *the* audio-visual program [such that] *to include in* each of the [a] plurality of copies [includes] its own respective unique pattern of enlarged images [to uniquely identify each copy] *in the sequence of the frames*.

*14. The method of claim 1, wherein the creating of the unique pattern of enlarged frames in the sequence of frames comprises:*

*receiving, in a router, the master version of the audio-visual program;*

*receiving, in the router, an altered version of the audio-visual program, wherein the altered version of the audio-visual program having enlarged frames of images at a set of predetermined locations in the sequence of frames; and*

*switching, by the router, at the set of predetermined locations between the master version of the audio-visual program and the altered version of the audio-visual program in accordance with the unique identification to generate the copy of the master version of the audio-visual program having the unique pattern of enlarged frames.*

*15. A non-transitory computer storage medium storing instructions which when executed by a computing device, cause the computing device to perform a method for uniquely identifying a copy of an audio-visual program, the method comprising:*

*selecting a master version of the audio-visual program to be copied;*

*making at least one copy of the master version of the audio-visual program such that each respective copy includes its own unique identification, wherein the master version of the audio-visual program comprises a sequence of frames of images, and wherein the making of the respective copy of the master version of the audio-visual program further comprises embedding the unique identification into the respective copy of the audio-visual program by:*

*generating an identifier using a random number generator;*

*selecting by the computing device, a plurality of different locations in the sequences of frames according to the identifier;*

*enlarging at least one frame in each of the plurality of locations in the sequence of frames in the copy according to the identifier;*

*creating a unique pattern of enlarged frames in the sequence of frames in the copy; and*

*storing an identity of a recipient of the copy and the unique pattern.*

*16. The non-transitory computer storage medium of claim 15, wherein the creating of the unique pattern of enlarged frames in the sequence of frames comprises:*

*receiving, in a router, the master version of the audio-visual program;*

*receiving, in the router, an altered version of the audio-visual program, wherein the altered version of the audio-visual program having enlarged frames of images at a set of predetermined locations in the sequence of frames; and*

*switching, by the router, at the set of predetermined locations between the master version of the audio-visual program and the altered version of the audio-visual program in accordance with the unique identification to generate the copy of the master version of the audio-visual program having the unique pattern of enlarged frames.*

*17. A computing device, comprising:*

*at least one server; and*

*a non-transitory computer storage medium storing instructions which when executed by the at least one server, causes the at least one server to perform:*

*selecting a master version of an audio-visual program to be copied;*

*making at least one copy of the master version of the audio-visual program such that each respective copy includes its own unique identification, wherein the master version of the audio-visual program comprises a sequence of frames of images, and wherein the making of the respective copy of the master version of the audio-visual program further comprises embedding the unique identification into the respective copy of the audio-visual program by:*

*generating an identifier using a random number generator;*

*selecting, by the computing device, a plurality of different locations in the sequences of frames according to the identifier;*

*enlarging at least one frame in each of the plurality of locations in the sequence of frames in the copy according to the identifier;*

*creating a unique pattern of enlarged frames in the sequence of frames in the copy; and*

*storing an identity of a recipient of the copy and the unique pattern.*

*18. The computing device of claim 17, further comprising a router configured to create the unique pattern of enlarged frames in the sequence of frames by:*

*receiving, in the router, the master version of the audio-visual program;*

*receiving, in the router, an altered version of the audio-visual program, wherein the altered version of the audio-visual program having enlarged frames of images at a set of predetermined locations in the sequence of frames; and*

*switching, by the router, at the set of predetermined locations between the master version of the audio-visual program and the altered version of the audio-visual program in accordance with the unique identification to generate the copy of the master version of the audio-visual program having the unique pattern of enlarged frames.*

* * * * *